United States Patent [19]
Pilmore

[11] Patent Number: 6,109,494
[45] Date of Patent: Aug. 29, 2000

[54] MOTORCYCLE TRANSPORT SYSTEM

[76] Inventor: William A. Pilmore, 515 E. Bennington Rd., Durand, Mich. 48429

[21] Appl. No.: 09/262,694

[22] Filed: Mar. 4, 1999

[51] Int. Cl.[7] .............................. B60R 7/00; B60R 9/00; B60R 11/00
[52] U.S. Cl. ....................... 224/547; 224/403; 224/924; 410/3
[58] Field of Search .................................. 410/2, 3, 7, 8, 410/9, 19, 22, 77; 248/500, 503; 224/403, 405, 547, 924

[56] References Cited

U.S. PATENT DOCUMENTS

| | | | |
|---|---|---|---|
| 3,753,579 | 8/1973 | Kurilich, Jr. | 410/3 X |
| 5,344,265 | 9/1994 | Ullman et al. | 410/3 |
| 5,599,035 | 2/1997 | Spence | 410/77 X |
| 5,795,115 | 8/1998 | Collins | 410/19 X |

*Primary Examiner*—D. Glenn Dayoan
*Assistant Examiner*—Scott A. Carpenter
*Attorney, Agent, or Firm*—Michael S. Neustel

[57] ABSTRACT

A motorcycle transport system for allowing transporting of a motorcycle and convenient securing/releasing of the motorcycle from a transporting device. The inventive device includes a base mountable to a bed of a transporting device, a pair of catch structures attached to opposing sides of the base, a permanent bracket secured to motorcycle frame members, a plurality of flanged end members extending downwardly from the permanent bracket, a pair of middle brackets each having a pair of slots for catchably securing to the flanged end members, a pair of pegs extending from the pair of middle brackets for releasably attaching to the pair of catch structures. The catch structures include a pair of levers for allowing the user to release the pegs from the catch structures with their foot.

12 Claims, 4 Drawing Sheets

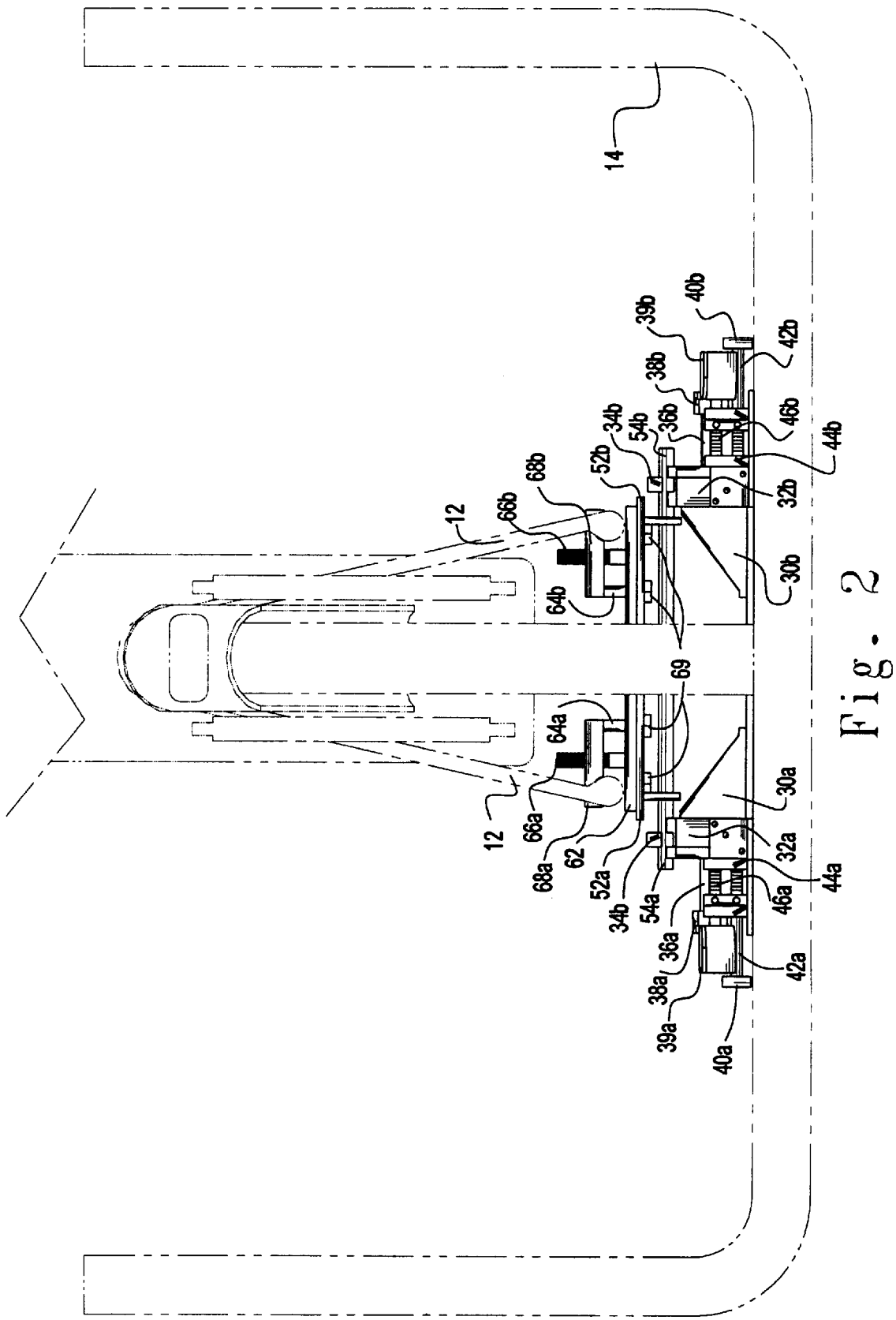

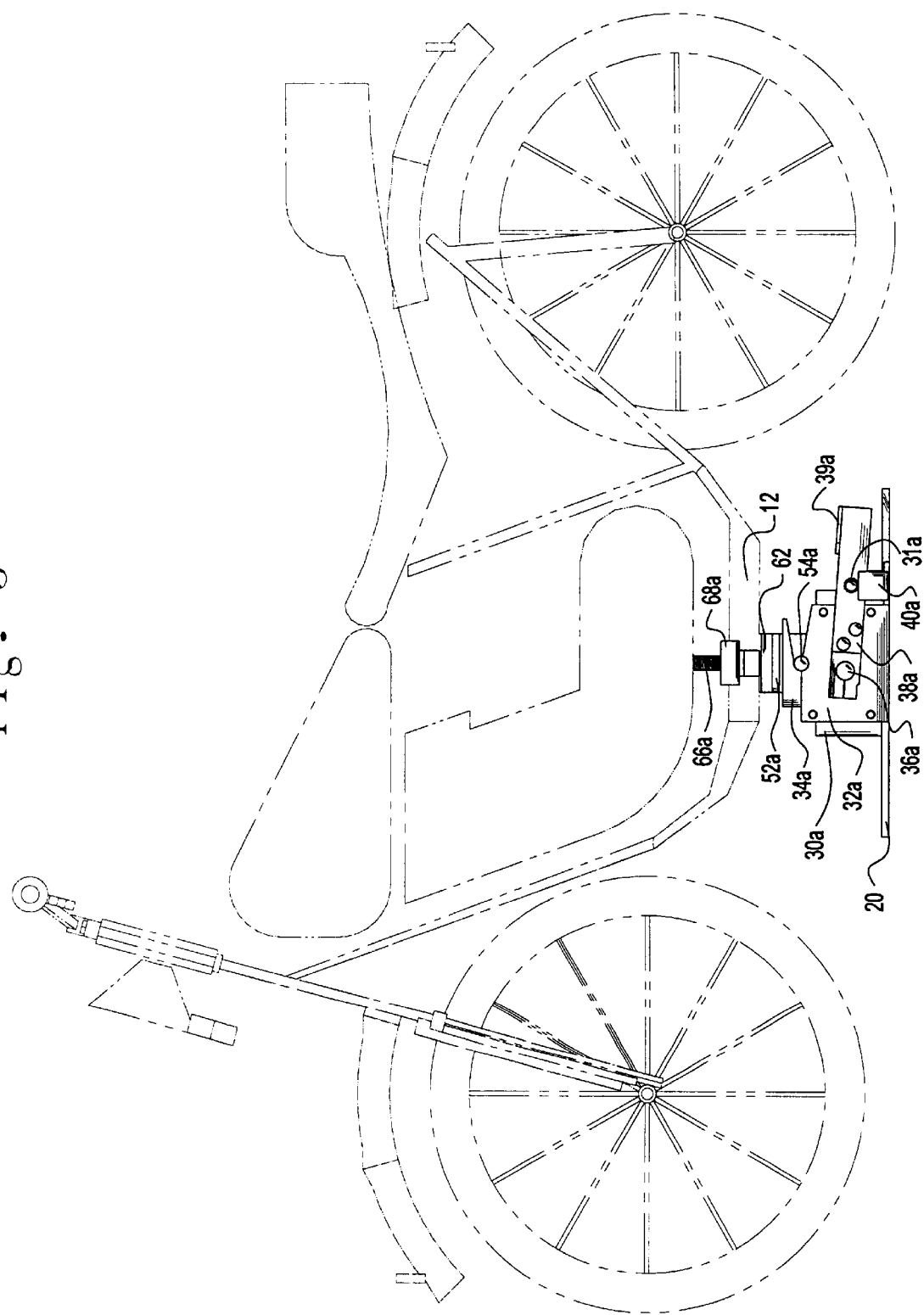

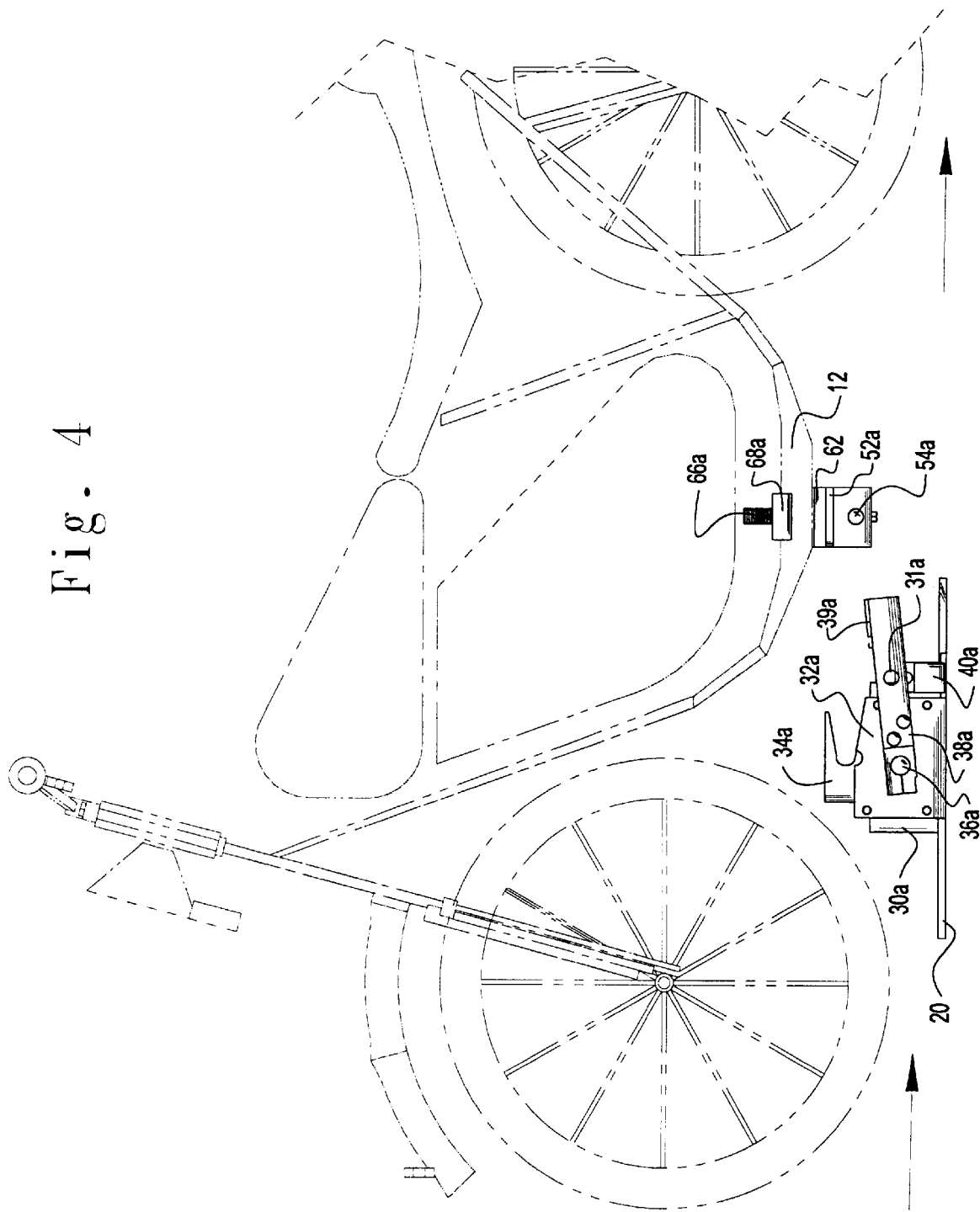

MOTORCYCLE TRANSPORT SYSTEM

BACKGROUND OF THE INVENTION

1. Field of the Invention

The present invention relates generally to motorcycles and more specifically it relates to a motorcycle transport system for allowing transporting of a motorcycle and convenient securing/releasing of the motorcycle from a transporting device.

Motorcycle users typically will transport their motorcycles to various locations. Motorcycles are transported on trailers, the bed of a pickup, or other transportation device. The user must use tie down straps attached to the front and rear portions of the motorcycle and then are attached to the transportation device. The user then will tighten the straps to prevent movement of the motorcycle during transportation. The motorcycle owner then must remove these straps prior to unloading the motorcycle. This process is not only time consuming but also inconvenient for the motorcycle owner substantially removing the enjoyment of owning a motorcycle. Hence, there is a need for a motorcycle transport system that easily secures and releases a motorcycle to a transportation device without undue burden.

2. Description of the Prior Art

Motorcycles have been in use for years. Typically, the motorcycle owner must utilize tie down straps to secure the motorcycle during transportation to prevent movement of the motorcycle. To remove the motorcycle, the user must remove each individual tie down strap which is time consuming and inconvenient, especially if the motorcycle owner is by themselves.

Examples of recreational vehicle securing devices include U.S. Pat. No. 5,749,685 to Hain; U.S. Pat. No. 5,593,259 to Kuo; U.S. Pat. No. 4,805,954 to Lazaroff; U.S. Pat. No. 4,671,713 to Lenkman; U.S. Pat. No. 5,785,471 to Godbersen; U.S. Pat. No. 4,934,572 to Bowman et al; U.S. Pat. No. 5,032,045 to Calco which are all illustrative of such prior art.

Hain (U.S. Pat. No. No. 5,749,685) discloses an adjustable securing apparatus for securing an ATV or snowmobile. Hain teaches a frame having a strap securely mounted to the bed of a vehicle, a swing arm pivotally mounted to the frame, a trailer ball coupler for attachment to a trailer ball secured on the ATV or snowmobile.

Kuo (U.S. Pat. No. 5,593,259) discloses a motor scooter packaging case for transporting a conventional motor scooter. Kuo teaches a rectangular base frame having four side portions, a rectangular upper frame, a rectangular front side frame, a rectangular rear side frame, a rectangular right side frame and a rectangular left side frame.

Lazaroff (U.S. Pat. No. No. 4,805,954) discloses a driver wheelchair lockdown for securing a wheelchair within a vehicle during transportation. Lazaroff teaches a frame capable of being secured to a floor and a movable clamp that is pivotally attached to the frame and capable of being moved between a wheelchair clamping position and a wheelchair release position.

While these devices may be suitable for the particular purpose to which they address, they are not as suitable for allowing transporting of a motorcycle and convenient securing/releasing of the motorcycle from a transporting device. Currently, there are no motorcycle transport systems available for consumers to allow easy and simple transportation of a motorcycle.

In these respects, the motorcycle transport system according to the present invention substantially departs from the conventional concepts and designs of the prior art, and in so doing provides an apparatus primarily developed for the purpose of allowing transporting of a motorcycle and convenient securing/releasing of the motorcycle from a transporting device.

SUMMARY OF THE INVENTION

In view of the foregoing disadvantages inherent in the known types of recreational vehicle securing devices now present in the prior art, the present invention provides a new motorcycle transport system construction wherein the same can be utilized for allowing transporting of a motorcycle and convenient securing/releasing of the motorcycle from a transporting device.

The general purpose of the present invention, which will be described subsequently in greater detail, is to provide a new motorcycle transport system that has many of the advantages of the recreational vehicle securing devices mentioned heretofore and many novel features that result in a new motorcycle transport system which is not anticipated, rendered obvious, suggested, or even implied by any of the prior art recreational vehicle securing devices, either alone or in any combination thereof.

To attain this, the present invention generally comprises a base mountable to a bed of a transporting device, a pair of catch structures attached to opposing sides of the base, a permanent bracket secured to motorcycle frame members, a plurality of flanged end members extending downwardly from the permanent bracket, a pair of middle brackets each having a pair of slots for catchably securing to the flanged end members, a pair of pegs extending from the pair of middle brackets for releasably attaching to the pair of catch structures. The catch structures include a pair of levers for allowing the user to release the pegs from the catch structures with their foot.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a motorcycle transport system that will overcome the shortcomings of the prior art devices.

Another object is to provide a motorcycle transport system that allows easy and simple securing/releasing of a motorcycle from a bed of a transporting device.

An additional object is to provide a motorcycle transport system that eliminates the need for conventional tie-down straps to secure a motorcycle.

A further object is to provide a motorcycle transport system that is not susceptible to accidentally releasing a motorcycle during transportation.

Another object is to provide a motorcycle transport system that does not require more than one individual to secure/release the motorcycle.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 2 is a rear view of the present invention secured to a bed of a transporting device and removably securing a motorcycle.

FIG. 3 is a side view of the present invention in the secured position.

FIG. 4 is a side view of the present invention in the released position.

DESCRIPTION OF THE PREFERRED EMBODIMENT

Figure 1:
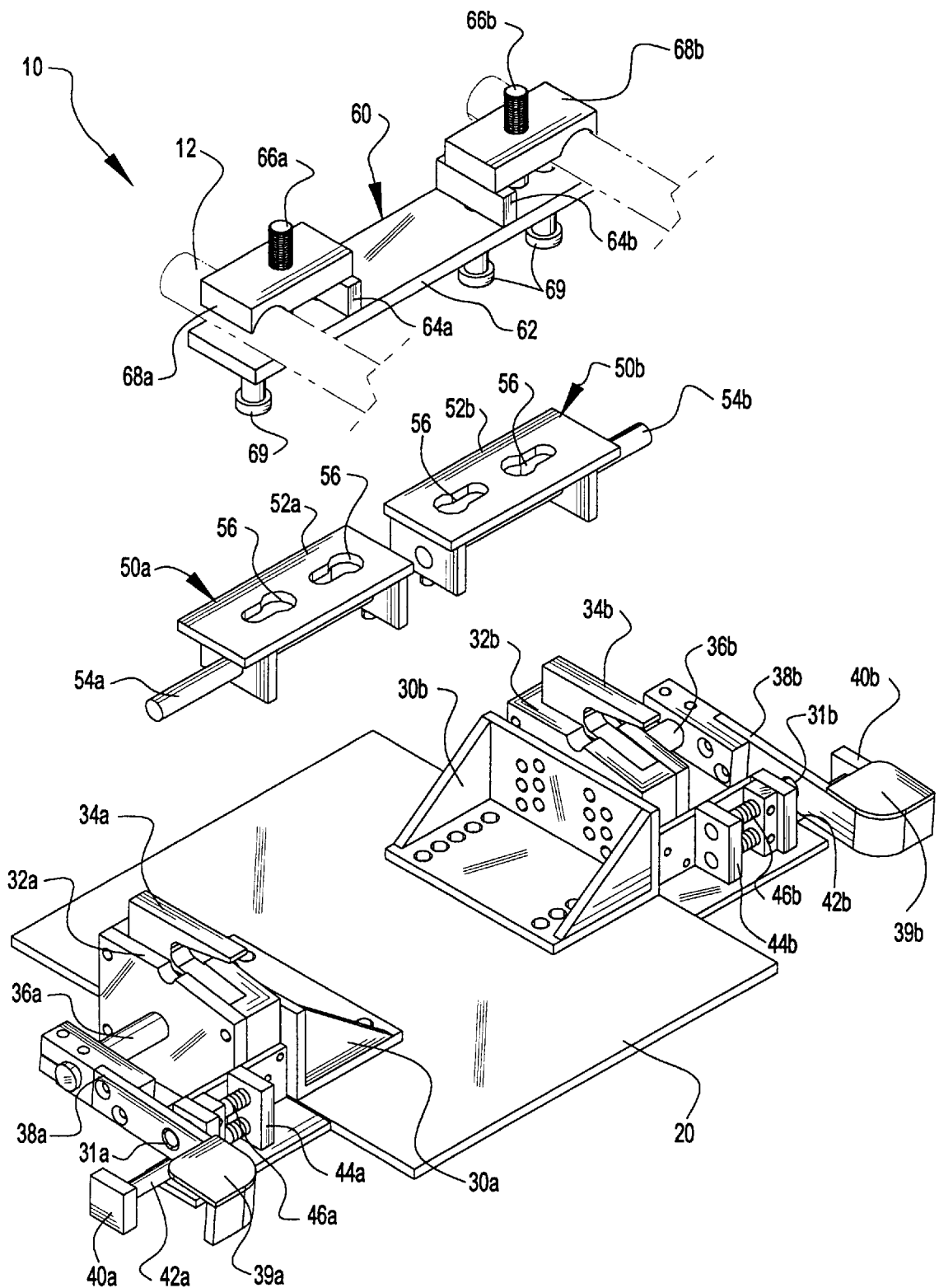
FIG. 1 is an exploded upper perspective view of the present invention.

Turning now descriptively to the drawings, in which similar reference characters denote similar elements throughout the several view, FIGS. 1 through 4 illustrate a motorcycle transport system 10, which comprises a base 20 mountable to a bed of a transporting device 14, a pair of catch structures attached to opposing sides of the base 20, a permanent bracket 60 secured to motorcycle frame members 12, a plurality of flanged end members 69 extending downwardly from the permanent bracket 60, a pair of middle brackets 50a–b each having a pair of slots 56 for catchably securing to the flanged end members 69, a pair of pegs 54a–b extending from the pair of middle brackets 50a–b for releasably attaching to the pair of catch structures. The catch structures include a pair of levers 38a–b for allowing the user to release the pegs 54a–b from the catch structures with their foot.

As best shown in FIG. 1 of the drawings, the base 20 is preferably comprised of a flat rectangular structure, however any well-known shape may be utilized. The base 20 may be secured to a conventional transporting device 14 as shown in FIG. 2 by conventional securing means. A pair of brackets 30a–b are attached to opposing sides of an upper surface of the base 20 as best shown in FIG. 1.

As shown in FIGS. 1 and 2 of the drawings, a pair of housings 32a–b are attached to the outer sides of the corresponding brackets 30a–b. The housings 32a–b each have a vertically orientated cavity that slidably receive a pair of hook members 34a–b as best shown in FIG. 1 of the drawings. The hook members 34a–b are forced upwardly by a conventional spring means within the housing. The hook members 34a–b preferably have a U-shape for receiving the pegs 54a–b.

As shown in FIGS. 1 and 2 of the drawings, a pair of rotating shafts 36a–b are rotatably extended through the housings 32a–b. An unshown cam member is attached to the inner end of the rotating shafts 36a–b for lowering the spring loaded hook members 34a–b.

As further shown in FIGS. 1 through 4 of the drawings, a pair of levers 38a–b are attached to the exposed end of the rotating shafts 36a–b. A corresponding pair of pedals 39a–b are secured to the distal ends of the levers 38a–b for allowing the user to rotate the rotating shafts 36a–b with their feet. The rotation of the rotating shafts 36a–b descends the hook members 34a–b into the secured position thereby locking the pegs 54a–b into the cutouts of the housings 32a–b as shown in FIG. 3 of the drawings.

As shown in FIGS. 1 and 2, a pair of brace members 44a–b are respectively secured to a pair of spring loaded lock shafts that slidably extend through a frame structure extended outwardly from the base 20. A pair of lock pins 46a–b are respectively attached to the brace members 44a–b for insertion into a pair of corresponding lock apertures 31 within the levers 38a–b. The lock pins 46a–b prevent accident rotation of the rotating shafts 36a–b during transportation of the motorcycle. A pair of lock handles 40a–b are attached respectively to the pair of lock shafts for allowing manual release of the hook members 34a–b.

As best shown in FIG. 1, a permanent bracket 60 is securable to the motorcycle frame members 12. The permanent bracket 60 comprises a support bar 62 having a pair of spacers 64a–b attached thereto as shown in FIGS. 1 and 2 of the drawings. A pair of clamps 68a–b having grooves are positionable about the opposite side of the motorcycle frame members 12. A pair of fasteners 66a–b are extendible through the support bar 62 to threadably engage the pair of clamps 68a–b for tightening against the motorcycle frame members 12 as shown in FIG. 1. As shown in FIG. 1, a plurality of flanged end members 69 are secured orthogonally to the bottom surface of the support bar 62.

A pair of middle brackets 50a–b are provided as shown in FIG. 1. The middle brackets 50a–b comprise a pair of support members 52a–b each having a pair of key shaped slots 56 for releasably engaging the flanged end members 69. As shown in FIGS. 1 and 2 of the drawings, a pair of pegs 54a–b are respectively attached to the outer ends of the support members 52a–b.

In use, the user secures the base 20 to the bed of the transporting device 14 such as a trailer or pickup. The user then secures the permanent bracket 60 to the motorcycle frame members 12 as shown in FIG. 1 of the drawings. When the user desires to load the motorcycle upon the transporting device 14, the user simply attaches the middle brackets 50a–b to the flanged end members 69. The user then manipulates the motorcycle forward onto the bed of the transporting device 14 where the hook members 34a–b are in the release position as shown in FIG. 4. The user moves the motorcycle forward until the pegs 54a–b are engaged within the hook members 34a–b. The user then depresses one of the pedals 39a–b with their foot to pull the hook members 34a–b downwardly thereby forcing the pegs 54a–b to be captured within the grooves of the housing as shown in FIG. 3 of the drawings. With the levers 38a–b positioned substantially level, the lock apertures 31 receive the spring loaded lock pins 46a–b thereby preventing the hook members 34a–b from becoming released. The user then transports the motorcycle upon the transporting device 14 to the desired location. When the user desires to unload the motorcycle, the user simply manipulates the lock handles 40a–b to release the rotating shafts 36a–b thereby allowing the hook members 34a–b to be in the release position as shown in FIG. 4 of the drawings. The motorcycle is then free to be backed from the motorcycle transport system 10 as shown in FIG. 4. The user then removes the middle brackets 50a–b from the permanent bracket 60 so as to not interfere with the operation of the motorcycle while leaving the permanent bracket 60 upon the motorcycle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A motorcycle transport system, comprising:
   a base securable to a bed of a transporting device;
   a first bracket means attachable to a frame of a motorcycle;
   a second bracket means removably attachable to said first bracket by an attaching means;
   a pair of pegs extending from said second bracket means; and
   a catch means secured to said base for selectively engaging said pair of pegs for securing said motorcycle to said transporting device;
   wherein said catch means comprises:
      a pair of housings secured to opposing sides of said base;
      a pair of grooves within said pair of housings for receiving said pegs;
      a cavity within each of said pair of housings;
      a pair of hook members slidably positioned within each cavity of said pair of housings; and
      a leverage means connected to each of said pair of housings and said pair of hook members for allowing a user to manually lower said hook members;
   wherein said leverage means comprises:
      a rotating shaft rotatable extending into said housing connected to a cam member that is mechanically connected to said hook member; and
      a lever attached to said rotating shaft for allowing a user to manually manipulate the rotating shaft and cam;
   a lock means for preventing said rotating shaft from accidentally becoming released;
   wherein said lock means comprises:
      a lock aperture within said lever;
      a brace member;
      a lock pin attached to said brace member for extending into said lock aperture; and
      a spring loaded lock shaft secured to said brace member for forcing said lock pin into said lock aperture.

2. The motorcycle transport system of claim 1 wherein said second bracket means comprises a pair of support members.

3. The motorcycle transport system of claim 1, wherein said attaching means comprises:
   a plurality of flanged end members extending from said first bracket means; and
   a plurality of slots within said pair of support members for catchably engaging said plurality of flanged end members.

4. The motorcycle transport system of claim 1, wherein said first bracket means comprises:
   a support bar;
   a pair of spacers attached to said support bar;
   a pair of clamps for surrounding said frame of said motorcycle; and
   a pair of fasteners extending through said support bar and threadably engagable to said pair of clamps.

5. The motorcycle transport system of claim 1, wherein said hook members are U-shaped.

6. The motorcycle transport system of claim 1, including a pair of pedals attached to said pair of levers.

7. A motorcycle transport system comprising:
   a rectangular shaped base securable to a bed of a transporting device;
   a first bracket means attachable to a frame of a motorcycle;
   a second bracket means removably attachable to said first bracket by an attaching means;
   a pair of pegs extending from said second bracket means; and
   a catch means secured to said base for selectively engaging said pair of pegs for securing said motorcycle to said transporting device;
   wherein said catch means comprises:
      a pair of housings secured to opposing sides of said base;
      a pair of grooves within said pair of housings for receiving said pegs;
      a cavity within each of said pair of housings;
      a pair of hook members slidably positioned within each cavity of said pair of housings; and
      a leverage means connected to each of said pair of housings and said pair of hook members for allowing a user to manually lower said hook members;
   wherein said leverage means comprises:
      a rotating shaft rotatable extending into said housing connected to a cam member that is mechanically connected to said hook member; and
      a lever attached to said rotating shaft for allowing a user to manually manipulate the rotating shaft and cam;
   a lock means for preventing said rotating shaft from accidentally becoming released;
   wherein said lock means comprises:
      a lock aperture within said lever;
      a brace member;
      a lock pin attached to said brace member for extending into said lock aperture; and
      a spring loaded lock shaft secured to said brace member for forcing said lock pin into said lock aperture.

8. The motorcycle transport system of claim 7, wherein said second bracket means comprises a pair of support members.

9. The motorcycle transport system of claim 7, wherein said attaching means comprises:

a plurality of flanged end members extending from said first bracket means; and a plurality of slots within said pair of support members for catchably engaging said plurality of flanged end members.

10. The motorcycle transport system of claim 7, wherein said first bracket means comprises:

a support bar;

a pair of spacers attached to said support bar;

a pair of clamps for surrounding said frame of said motorcycle; and a pair of fasteners extending through said support bar and threadably engagable to said pair of clamps.

11. The motorcycle transport system of claim 7, wherein said hook members are U-shaped.

12. The motorcycle transport system of claim 7, including a pair of pedals attached to said pair of levers.

* * * * *